(12) United States Patent
Rupert

(10) Patent No.: US 7,352,287 B2
(45) Date of Patent: Apr. 1, 2008

(54) PNEUMATIC CONTROLLER

(75) Inventor: Matthew Rupert, Amity, OR (US)

(73) Assignee: Veris Industries, LLC, Portland, OR (US)

( * ) Notice: Subject to any disclaimer, the term of this patent is extended or adjusted under 35 U.S.C. 154(b) by 239 days.

(21) Appl. No.: 11/326,025

(22) Filed: Jan. 4, 2006

(65) Prior Publication Data
US 2006/0244617 A1    Nov. 2, 2006

Related U.S. Application Data

(60) Provisional application No. 60/641,983, filed on Jan. 7, 2005.

(51) Int. Cl.
*G08B 21/00* (2006.01)

(52) U.S. Cl. .................. 340/635; 340/661; 340/442; 340/451; 340/626; 340/870.09; 137/102; 137/413; 137/487.5; 137/505.12; 73/716; 73/717; 73/753

(58) Field of Classification Search .............. 340/635, 340/661, 442, 451, 626, 870.09; 137/102, 137/413, 487.5, 505.12; 73/716, 717, 753
See application file for complete search history.

(56) References Cited

U.S. PATENT DOCUMENTS 3,861,411 A * 1/1975 Mitchell et al. .............. 137/82
6,029,524 A * 2/2000 Klauder et al. ............... 73/718

* cited by examiner

*Primary Examiner*—Tai Nguyen
(74) *Attorney, Agent, or Firm*—Chernoff, Vilhauer, McClung & Stenzel

(57) ABSTRACT

A pneumatic controller for controlling a device.

15 Claims, 3 Drawing Sheets

PNEUMATIC CONTROLLER

CROSS-REFERENCE TO RELATED APPLICATIONS

This application claims the benefit of U.S. Provisional App. No. 60/641,983, filed Jan. 7, 2005.

BACKGROUND OF THE INVENTION

The present invention relates to a pneumatic controller.

Pressure transducers typically include at least first and second pressure ports. The first pressure inlet port is normally attached to a high pressure inlet line and the second pressure port is normally attached to a lower pressure outlet line. The pressure transducer receives an input signal indicative of the desired output pressure. The pressure transducer is intended to provide the desired output pressure with little flow between the input and output pressure lines. The transducer may include a single diaphragm or other sensor element affected by the input pressure and input signal to provide the desired output pressure, or it may include two separate pressure transducers.

Such pressure transducers are most commonly provided as a stand-alone device. Installation in the field may require two or more individuals, namely, an electrician to run the electrical lines and a plumber or pipe-fitter to run the fluid lines. Additionally, the plumber or pipe-fitter may install an isolation valve on the high pressure input line. The isolation valve can be closed to close off or "isolate" the high pressure line from the pressure elements.

Pressure transducers assemblies may incorporate both the transducer(s) and the isolation valve assembly as a single product, and thus require less field installation time. In particular, the connections made between the isolation valve and the pressure transducer(s) may be made as a manufacturing step for the assembly rather than in the field.

In many cases, input control signals are provided from a remote controller using a voltage signal, current signal, or digital input signal. In this manner, the output pressure may be remotely controlled. In order to control the pressure transducer and thus the output pressure, the controller is programmed with suitable instructions to provide the desired input signals at the desired times.

DETAILED DESCRIPTION OF PREFERRED EMBODIMENT

A traditional pneumatic transducer provides an industry standard 0-20 PSI or 3-15 PSI output pressure range. The pressure may be with reference to an absolute value, such as a vacuum or known pressure, or otherwise relative to another variable pressure (e.g., differential pressure). Selecting between 0-20 PSI or 3-15 PSI is normally selectable by the installer with a set of jumpers. In some environments, such as when the pneumatic controller needs to position a damper, the damper may have essentially no movement from 0 to 8 PSI because of internal friction. Then from 8 to 15 PSI the damper has movement across its full range of motion, and from 15 to 20 PSI the damper has exceeded its movement range and thus no movement of the damper occurs. Accordingly, in order to accommodate the actual movement of the damper the pneumatic controller or a control system associated with a pneumatic transducer is programmed to use a range of 8 to 15 PSI for the damper. Unfortunately, using a reduced range reduces the resolution with which the pneumatic transducer may be controlled and requires extra time and expense to properly program the system, which is prone to error.

Figure 1:
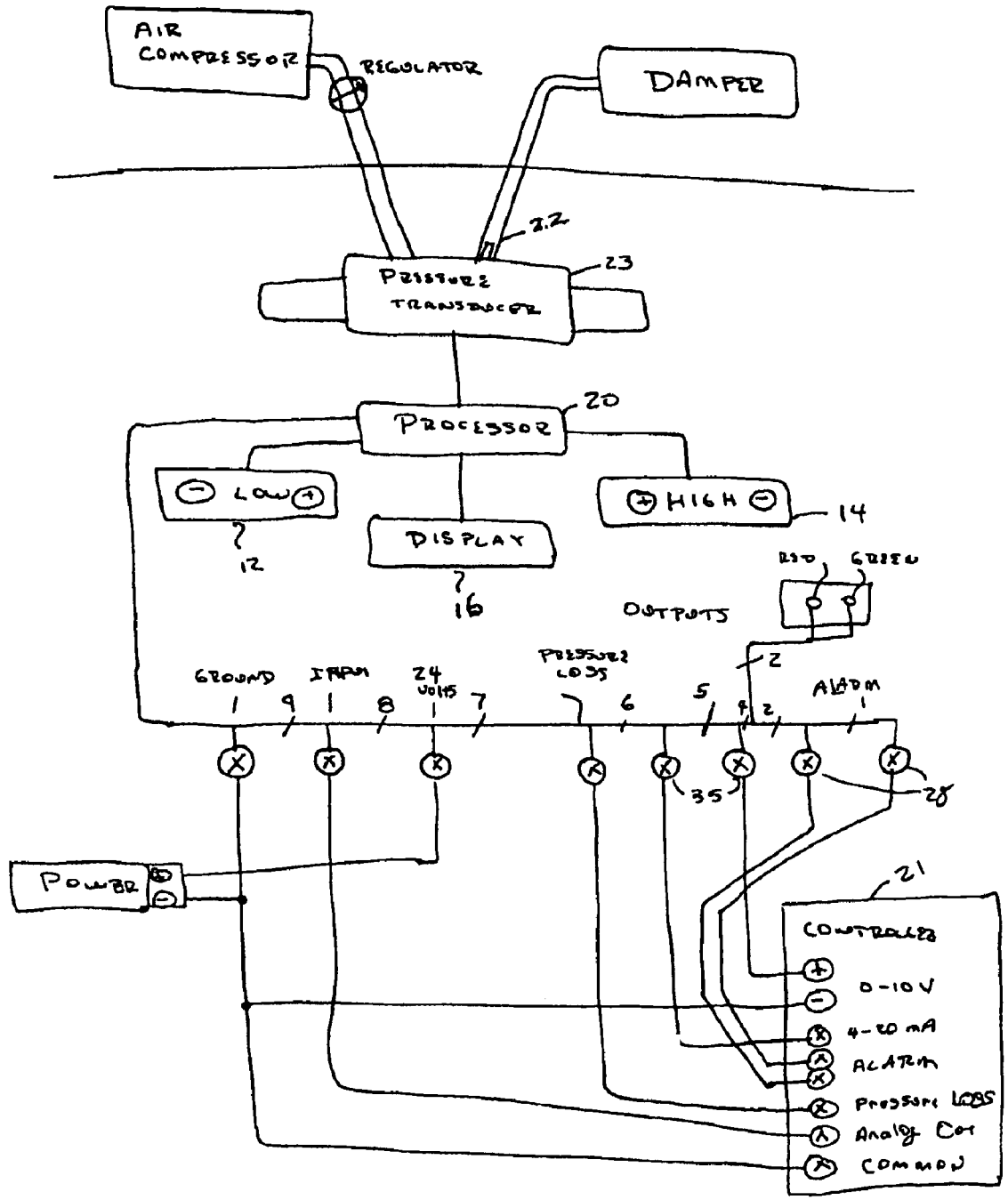
FIG. 1 illustrates a pneumatic controller.

Referring to FIG. 1, to reduce one or more of these concerns, the preferred pneumatic controller 10 includes an adjustable lower set point adjustment 12 and an adjustable higher set point adjustment 14 for the range of output values to be provided. The pressure set points are illustrated on a display 16 integral to the pneumatic controller 10 so that the installer may view the values as they are adjusted. Accordingly, the installer may adjust the lower set point while viewing the lower pressure setting value on the display 16, and the installer may adjust the higher set point while viewing the higher pressure setting value on the display 16. In this manner, the installer may readily set the pressure range while viewing the values on the display in an intuitive manner. Also, the resolution of the range defined by the higher and lower settings is preferably greater than the resolution that would be available if the settings remained at the maximum range. In other words, there may be a finer gradation in the available output levels within the smaller defined range that would be available in the same range if the settings remained at the maximum range. The operation of the pneumatic controller 10 is controlled by a processor 20.

In operation, the pneumatic controller 10 receives a standard input signal, such as 0 to 10 volts, or 4 to 20 ma, from a controller 21. The processor 20 converts the input signal to control an associated transducer 23 for a desired output pressure 22 using the defined mapping. In this manner, the controller 21 may be programmed in a normal manner with a full signal range used to define the full range of the device being controlled using the internal mapping. Moreover, the mapping is performed by the pneumatic controller 10 which permits multiple different controllers 21 to operate the same device, without customizing the programming at each controller 21.

A pair of alarm contacts 28 may be included which provide a normally open condition when no power is applied to the controller 10 or when in an alarm state occurs. The alarm contacts are closed in normal operation. In addition, the alarm function may include an automatic mode and a manual mode, where the alarm contacts 28 are open when the alarm function is in the manual mode. The manual mode of operation permits the installer to control the transducer 23 locally for configuring the device and for over-riding the centralized controller 21. However, in the event that the installer forgets to turn the device off from manual mode, then an alarm condition will be activated, so that the installer is reminded that the device is in manual mode. The alarm contacts 28 will close in the automatic mode (normal operation). Also, a pressure loss alarm 26 may be included in the same device to provide an output when the branch pressure 22 is reduced below a predetermined level, such as 20% below the desired pressure for a period of 2 minutes. The pressure alarm 26 is indicated by opening the contacts, which are normally closed. The controller 10 includes both capabilities, which are either both simultaneously enabled or jumper selected in the alternative.

The controller 10 may include a set of colored light emitting diodes 30, such as green and red, to provide an indication of the operational status of the device. The colored light emitting diodes 30 may blink to provide an indication of the status.

| Blinking Operation | Status |
|---|---|
| Slow green | Normal operation |
| Slow green with one fast red | Manual mode alarm active (contacts open) |
| Slow green with two fast reds | Pressure loss alarm active (contacts open) |
| Slow red | Device not in operate (run) mode |
| Two fast reds | Device not in operate (run) mode and alarm (contacts open) |
| Three fast reds | Over voltage or over current fault |
| Four fast reds | Over pressure on branch side |

Figure 2:
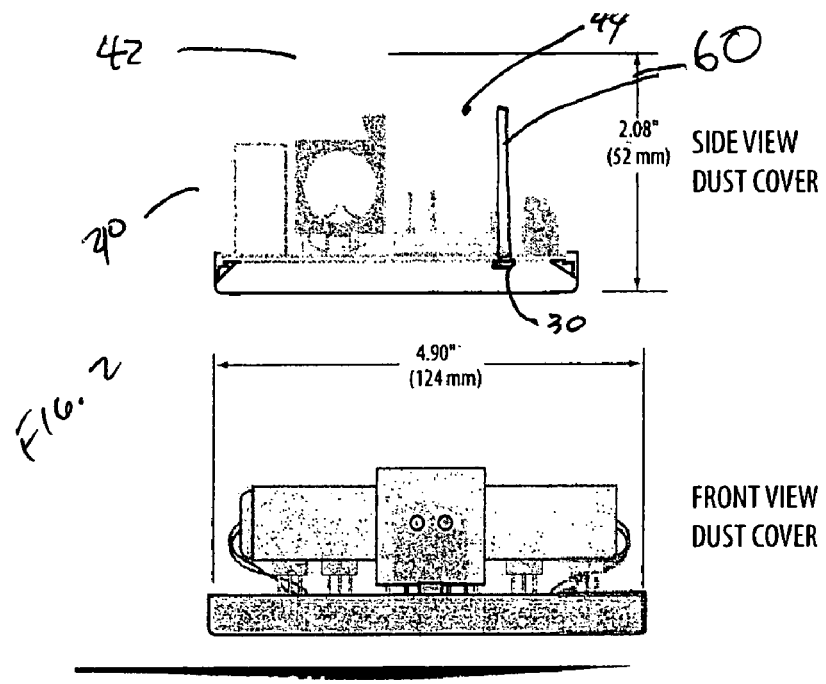
FIG. 2 illustrates a pneumatic controller with a cover.
Figure 3:
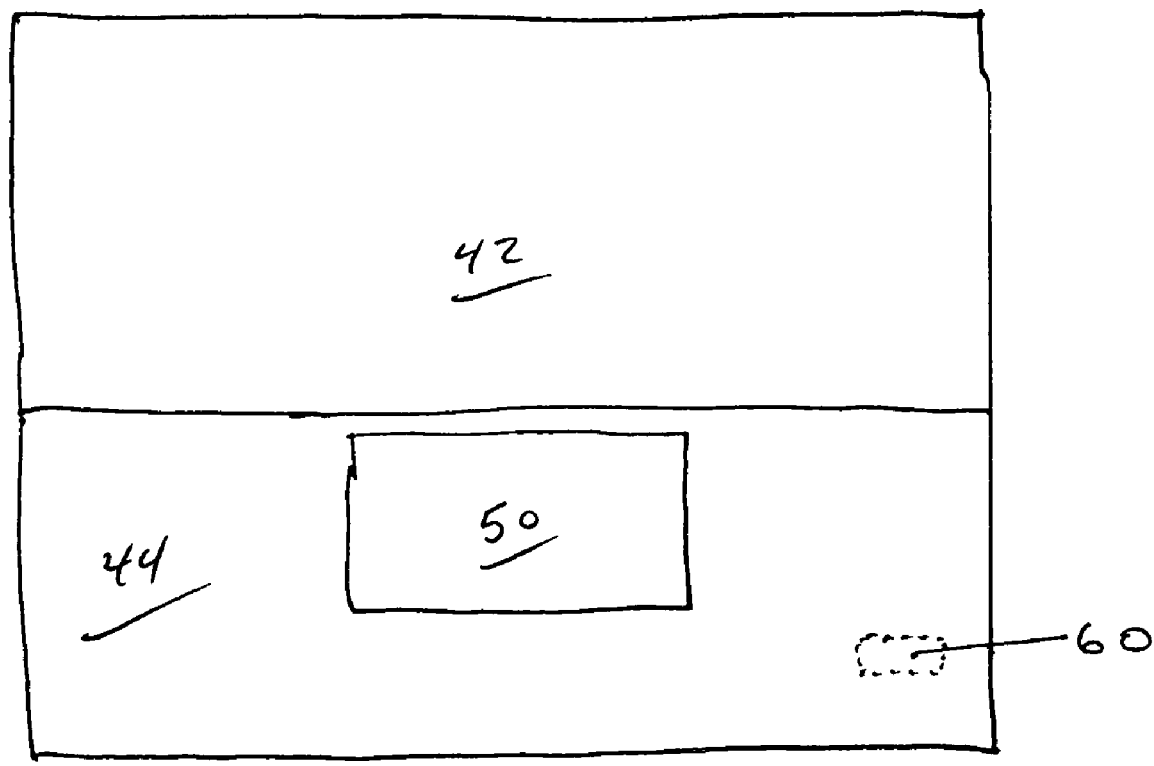
FIG. 3 illustrates a pneumatic cover.

Referring to FIG. 2, the controller 10 may include a plastic cover 40. The plastic cover 40 may include a dual elevational profile having a raised portion 42 and a lower portion 44. The installer observes the display 16 through the lower portion of the cover 40. The cover 40 protects the device from the environment, but obscures clearly difficult observing the light emitting diodes 30 and the display 16 through the cover 40. Referring to FIG. 3, the lower portion of the cover 40 may include a window 50 that is more transparent the adjoining material. In this manner the display 16 may be readily observed while tending to protect the remainder of the controller 10 from undesirable light. In addition, a light pipe 60 of plastic material may be included from the lower surface of the cover 40 to a location proximate the diodes 30 so that the diodes are more readily observable by the light being directed by the light pipe 60 to the exterior surface of the cover 40.

Typically a pneumatic controller 10 receives control signals and in response thereto provides an appropriate output pressure 22. In the event of a problem an alarm condition is not indicated to the controller 21 from the pneumatic controller 10 the controller 21 presumes that the pneumatic controller 10 is functioning properly. In order to have additional confidence that the pneumatic controller 10 is functioning properly, a redundant analog output signal 35 in the form of a 4-20 ma signal or 0 to 10 volt signal may be provided representative of the output pressure 22. In this manner the controller 21 may have an additional indication of whether the pneumatic controller 10 is functioning properly.

Figure 4:
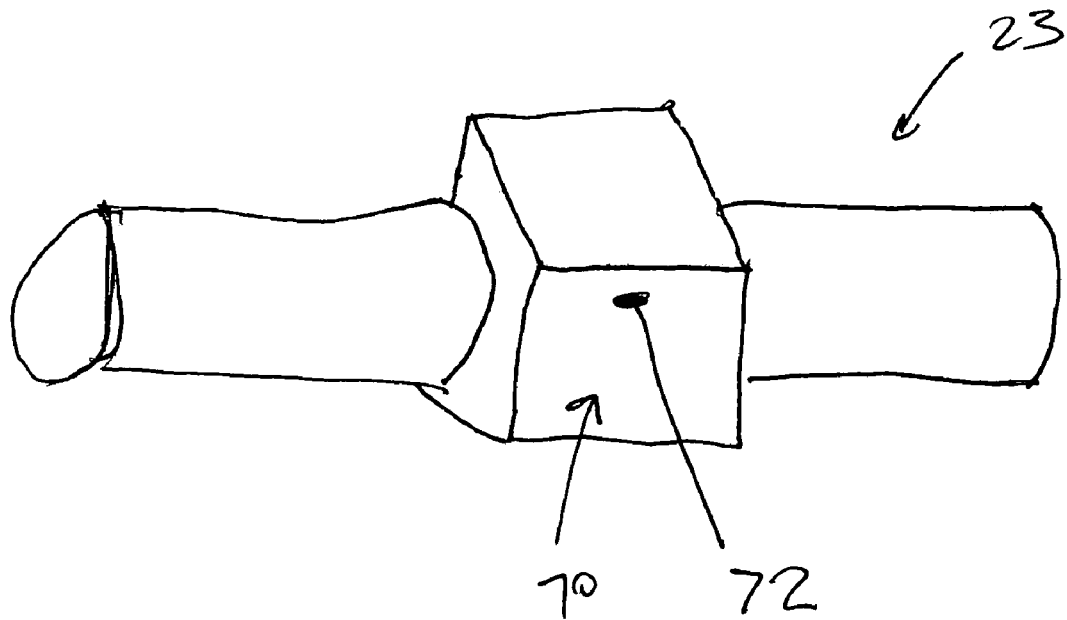
FIG. 4 illustrates a pneumatic transducer.

Referring to FIG. 4, the pressure transducer 23 needs to 'bleed' off excessive air into the atmosphere during its normal operation. While this is a simple matter, this tends to result in excessive noise which is troubling to some installers and use in quiet environments. To reduce the noise levels, the pressure transducer 23 may include a small chamber 70 which acts to muffle the air. A small opening 72 in the small chamber 70 then bleeds the air into the atmosphere or otherwise the region under the cover 40.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:
1. A pressure controller comprising:
 (a) a pneumatic transducer that includes an input pneumatic port and an output pneumatic port;
 (b) a first adjustment mechanism to select a lower pressure limit for said output pneumatic port;
 (c) a second adjustment mechanism to select an upper pressure limit for said output pneumatic port;
 (d) a display that presents an indication of said lower pressure limit while adjusting said first adjustment mechanism;
 (e) said display presents an indication of said upper pressure limit while adjusting said second adjustment mechanism;
 (f) said pressure controller controlling said pneumatic transducer with a resolution for a range less than the maximum range of said first and second adjustment mechanisms greater than it would have been had the first and second adjustment mechanisms been at their maximum range.

2. The controller of claim 1 further comprising a cover covering said pneumatic transducer and said display.

3. The controller of claim 2 wherein said cover has greater transparency in a region above said display than the remainder of said cover.

4. The pressure controller of claim 1 further comprising an electrical input that receives an electrical signal, which in response to receiving said electrical signal, sets the pressure level for said output pneumatic port.

5. The pressure controller of claim 1 further comprising an alarm output that provides an indication of an alarm state.

6. The pressure controller of claim 5 wherein said alarm state indicates a manual mode.

7. The pressure controller of claim 5 wherein said alarm state indicates an over voltage condition.

8. The pressure controller of claim 5 wherein said alarm state indicates an over current fault.

9. The pressure controller of claim 5 wherein said alarm state indicates over pressure on said output pneumatic port.

10. A pressure controller comprising:
 (a) a pneumatic transducer that includes an input pneumatic port and an output pneumatic port;
 (b) a first adjustment mechanism to select a lower pressure limit for said output pneumatic port;
 (c) a second adjustment mechanism to select an upper pressure limit for said output pneumatic port;
 (d) an alarm signal output that provides an indication of an alarm state of said pressure controller;
 (e) a pressure loss output that provides an indication that the pressure provided on said output pneumatic port is less than desired.

11. The pressure controller of claim 10 wherein said alarm signal output and said pressure loss output are alternatively selectable.

12. The pressure controller of claim 10 wherein said alarm signal output and said pressure loss output are both simultaneously enabled.

13. A pressure controller comprising:
 (a) a pneumatic transducer that includes an input pneumatic port and an output pneumatic port;
 (b) a first adjustment mechanism to select a lower pressure limit for said output pneumatic port;
 (c) a second adjustment mechanism to select an upper pressure limit for said output pneumatic port;
 (d) a first optical indicator;
 (e) a second optical indicator;

(f) providing a slow blinking of said first optical indicator when said pressure controller is operating normally;
(g) providing a slow blinking of said first optical indicator and a single associated fast blinking of said second optical indicator when said pressure controller is in a manual mode;
(h) providing a slow blinking of said first optical indicator and a pair of associated fast blinking of said second optical indicator when a pressure loss alarm is active;
(i) providing a slow blinking of said second optical indicator when said pressure controller is not in an operate mode;
(j) providing a pair of fast blinking of said second optical indicator when said pressure controller is said not in an operate mode and an alarm is active;
(k) providing three fast blinking of said second optical indicator when an over voltage or an over current fault occurs;
(l) providing four fast blinking of said second optical indicator when an over pressure occurs at said output pneumatic port.

14. A pressure controller comprising:
(a) a pneumatic transducer that includes an input pneumatic port and an output pneumatic port;
(b) a first adjustment mechanism to select a lower pressure limit for said output pneumatic port;
(c) a second adjustment mechanism to select an upper pressure limit for said output pneumatic port;
(d) an analog output signal indicating the pressure at said output pneumatic port;
(e) a digital signal indicating an alarm condition.

15. The pressure controller of claim 14 wherein said digital signal comprises an open circuit condition and a closed circuit condition.

* * * * *